J. W. EBERMAN.
AIR COMPRESSOR.
APPLICATION FILED SEPT. 28, 1908.

969,139.

Patented Aug. 30, 1910.

Witnesses
Henry Linn Wells
Harry H. Reynolds

Inventor:
Joseph W. Eberman
By Edward F. Wilson
Attorney

UNITED STATES PATENT OFFICE.

JOSEPH W. EBERMAN, OF CHICAGO, ILLINOIS, ASSIGNOR TO EBERMAN AUTO APPLIANCE COMPANY, OF CHICAGO, ILLINOIS, A CORPORATION OF ILLINOIS.

AIR-COMPRESSOR.

969,139.  Specification of Letters Patent.  Patented Aug. 30, 1910.

Application filed September 28, 1908. Serial No. 455,152.

*To all whom it may concern:*

Be it known that I, JOSEPH W. EBERMAN, a citizen of the United States, residing at Chicago, in the county of Cook and State of Illinois, have invented certain new and useful Improvements in Air-Compressors; and I hereby declare the following to be a full, clear, and exact description of the invention, such as will enable others skilled in the art to which it appertains to make and use the same.

My invention relates to a novel form and application of a power-driven air compressor or pump, the object being to provide an air compressor and a mounting for same adapted to be permanently mounted on the frame of an automobile in such a manner that the compressor can readily be put into action and stopped when desired, and consists in the features of construction and combinations of parts hereinafter fully described and claimed.

Figure 1:
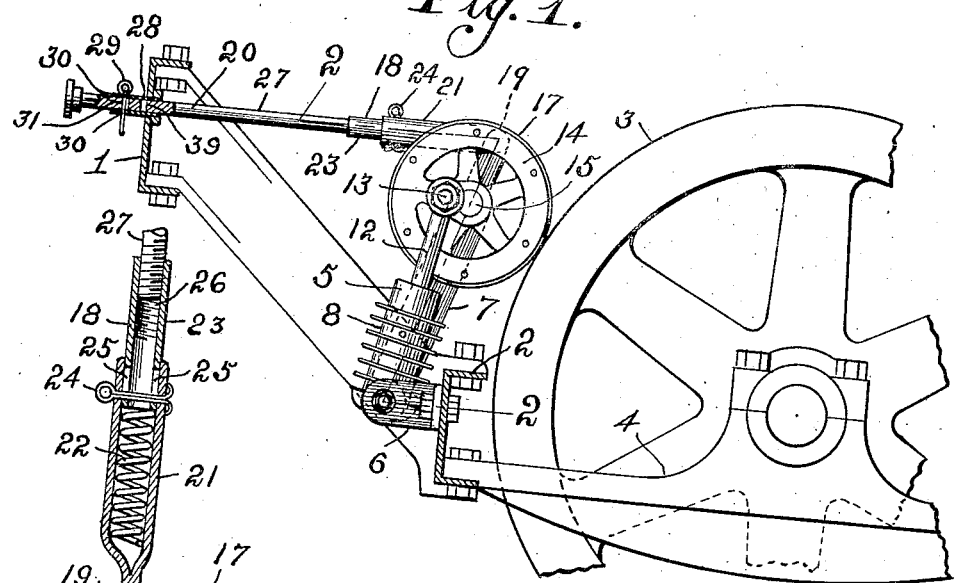
Figure 2:
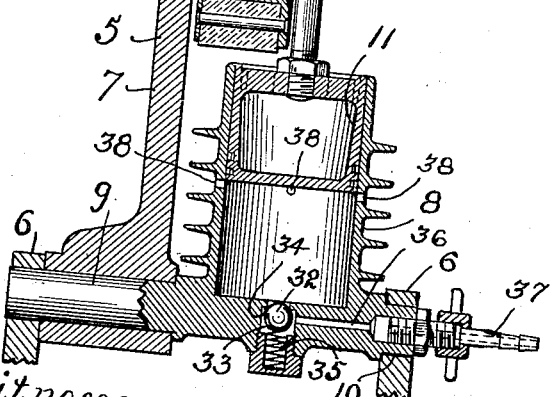

In the accompanying drawings illustrating my invention,—Figure 1 is a fragmentary cross section of an automobile frame showing a compressor made and mounted therein in accordance with my invention. Fig. 2 is a fragmentary section of the compressor on the line 2—2 of Fig. 1.

One of the most laborious operations in caring for an automobile is that of filling the pneumatic tires with air to the proper pressure, and when it is desired to use the power of the engine of the automobile to compress air to the necessary pressure various difficulties present themselves, for the overcoming of which I have devised the illustrated pump and its mountings.

The space available for the mounting of a compressor in the ordinary automobile is very limited, and one of the main objects of my invention is to produce a compressor and mounting for same which would have a wide range of adaptability in its mode of application and yet occupy the very least possible space.

In said drawings, 1 is the main side frame of the automobile, 2 is the side bar of what is known as the sub-frame, 3 is the fly wheel of the automobile engine, and 4 is the cross bar upon which one end of the engine is mounted. The compressor 5 is mounted in brackets 6, which are rigidly attached to said sub-frame 2, in such a manner as to permit an oscillatory movement to the frame 7 of said compressor for the purpose, as will hereinafter be shown, of starting and stopping said compressor. Said compressor 5 comprises a cylinder 8 integral with journals 9 and 10 at its base, by means of which said compressor is mounted in said brackets 6. Between said cylinder 8 and one of said brackets 6 the frame 7 of said compressor is revolubly mounted on said journal 9. A piston 11 is mounted operatively in said cylinder on one end of a piston rod 12, which connects said piston with a crank pin 13 mounted in the face of a wheel 14 which is rigidly mounted on one end of a shaft 15, which is carried in a bearing 16 formed in the opposite end of said frame 7 of the compressor. Said wheel is provided on its periphery with an outer rim 17 of some frictional material, such as leather, paper or cloth, and is adapted to be brought into operative connection with the periphery of the fly wheel 3 or other revolving member of the engine or operative mechanism of the automobile, whereby said wheel will be revolved, and said piston will be moved back and forth in said cylinder. To press said wheel 14 against the driving member 3 and hold same in proper operative contact, the spring push rod 18 is provided, one end 19 of which is pivotally connected to the free end of said compressor frame 7, and the other end 20 of which is supported in the frame 1 or other suitable portion of the automobile. It is desirable to press the wheel 14 against the driving member with a yielding pressure, and also to provide adjustment for this pressure so that the contact pressure may be varied to provide for varying conditions. To provide for this, said push rod 18 consists of a tube or casing 21, one end of which is pivotally connected to said compressor frame, and which carries, mounted in same, a compression spring 22. The free end of said tube 21 carries a sliding member 23 mounted within same, the inner end of which bears against one end of said spring 22, and which is prevented from removal from said tube 21 by means of the cotter or pin 24, which passes through openings in the walls of said tube 21, and also through longitudinal slots 25 in the walls of said member 23. The outer end of said member 23 is provided with a central screw-threaded opening 26 adapted to receive one end of a screw-threaded rod 27, which is provided on its outer end with an enlarged head or knob to facilitate the application of endwise pressure to said rod to force said wheel 14 into contact with said fly wheel 3, in an obvious manner. To hold said wheel 14 in operative contact, said rod 27 is mounted between its ends in a short tubular bearing 28, which is rigidly mounted in the frame 1 or other convenient portion of the automobile, and a pin 29 is provided which is adapted to pass through holes 30 in the walls of said tube, and also through a hole 31 in said rod 27 when said rod has been forced to one limit of its movement. Should the pressure with which said wheel 14 is forced against the fly wheel 3 not be the proper amount for operating the compressor, it can be increased or decreased by screwing said rod 27 out of or into said member 23 a half turn or more. Said cylinder 8 of said compressor is provided with a ball check-valve 32 mounted in a chamber 33 in the base of said compressor, and held against its seat 34 by means of the compression spring 35. The bearing 10 of said compressor is provided with a central opening 36 communicating with said valve chamber 33, through which the compressed air escapes from said compressor. The outer end of said bearing 10 is provided with a hose connection 37, to which the hose may be connected, by means of which the compressed air may be carried to the tires of the automobile. To provide means by which the air may enter said cylinder 8 of said compressor, a ring of small openings 38 are provided through the wall of said cylinder 8 in such a position that they are uncovered by said piston 11 as the same reaches the outer limit of its movement, as illustrated in Fig. 2. In operating said compressor, said frame 7 carrying the wheel 14 is oscillated in said bearings 9 and 10 in said brackets 6 until said wheel 14 is brought into operative contact with said fly wheel 3 and is locked in said position by means of the pin 29. To hold said compressor out of operative contact with said fly wheel a second hole 39 is provided in said rod 27, through which said pin may be passed when said rod 27 is drawn back sufficiently, in which position said friction wheel is out of contact with said fly wheel.

I claim as my invention:

1. The combination with a driven rotating member, of an oscillating frame, a rotating member carried thereby, a longitudinally-adjustable rod connected at one end with said oscillating frame, a guide through which the free end portion of said rod passes, coacting locking means disposed on said rod and its guide to lock said rod against movement, and a pump operatively connected with said rotating member and carried by said oscillating frame, said rod serving to move said frame to throw said rotating members into surface contact with each other to actuate said pump.

2. The combination with a driven rotating member, of an oscillating frame, a rotating member carried thereby, a rod comprising two relatively longitudinally movable members coupled with each other connected at one end with said oscillating frame, a spring normally maintaining said rod extended to its greatest limit of length, a guide through which the free end portion of said rod passes, coacting locking means disposed on said rod and its guide to lock said rod against movement, and a pump operatively connected with said rotating member and carried by said oscillating frame, said rod serving to move said frame to throw said rotating members into surface contact with each other to actuate said pump, said spring serving to maintain said rotating members yieldingly in engagement with each other.

3. The combination with a driven rotating member, of an oscillating frame, a rotating member carried thereby, a rod comprising two telescopically movable members, connection between said telescopic members permitting relative longitudinal movement, comprising a transverse pin passing through springs in the walls of the outer of said telescopic members, said inner member being provided with a longitudinal slot or opening through which said pin is adapted to pass, a spring mounted within one of said telescopic members and adapted to normally hold said members at one limit of their relative movement, connection at one end of said telescopic members with said oscillating frame, a rod having adjustable connection with the opposite end of said telescopic members, a guide through which the free end portion of said rod passes, coacting locking means disposed on said rod and its guide to lock said rod against movement, and a pump operatively connected with said rotating member and carried by said oscillating frame, said rod serving to move said frame to throw said rotating members into surface contact with each other to actuate said pump.

4. The combination with a driven rotating member, of an oscillating frame, a rotating member carried thereby and adapted to be thrown into operative engagement with said driven member to be rotated thereby, a pump, and operative connection between said last named rotating member and the pump, means operatively engaging said oscillating frame to actuate the same, said means being yieldable and adjustable to increase or decrease the pressure of one rotating member on the other, and locking means adapted to engage said engaging means to maintain said oscillating frame in a given position.

5. The combination with a driven rotating member, of an oscillating frame, a rotating member carried thereby and adapted to be thrown into operative engagement with said driven member to be rotated thereby, a rod connected at one end with said oscillating frame and adjusted longitudinally, a pump carried by said oscillating frame and operatively connected to said last named rotating member, and locking means adapted to engage said rod to maintain said oscillating frame in a given position.

In testimony whereof I have signed my name in presence of two subscribing witnesses.

JOSEPH W. EBERMAN.

Witnesses:
 EDWARD F. WILSON,
 W. A. EBERMAN.